May 28, 1957 E. J. SCHAEFER 2,794,161
OVERLOAD PROTECTORS
Filed April 24, 1956
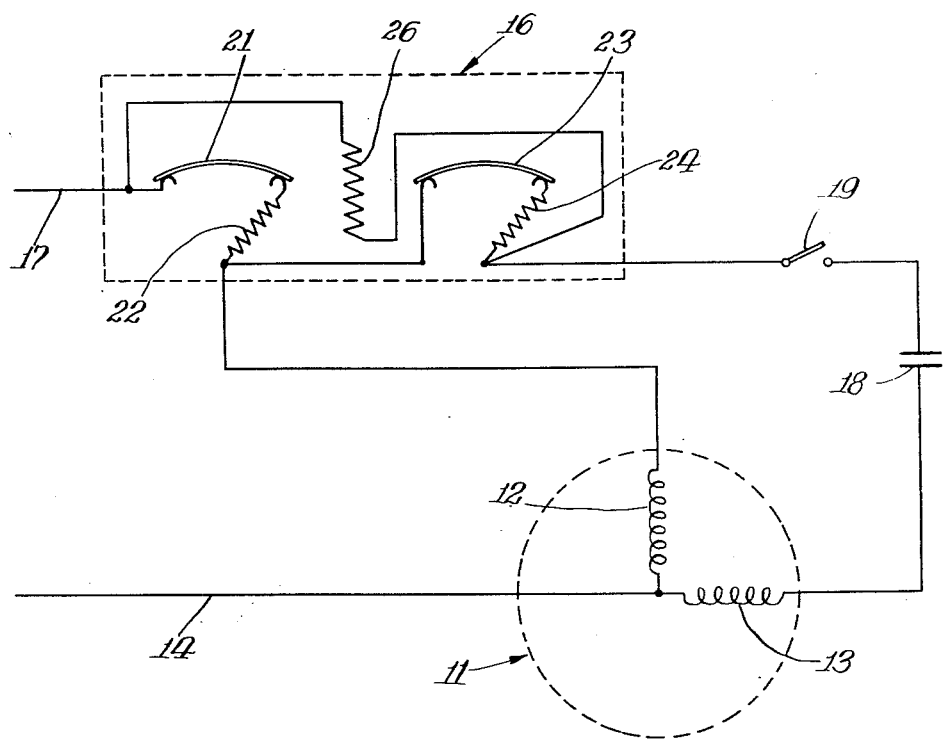
INVENTOR.
Edward J. Schaefer,
BY
Davis, Lindsey, Hibben & Noyes
Attys.

United States Patent Office 2,794,161
Patented May 28, 1957

2,794,161

OVERLOAD PROTECTORS

Edward J. Schaefer, Fort Wayne, Ind.

Application April 24, 1956, Serial No. 580,196

12 Claims. (Cl. 318—221)

This invention relates to electric circuit protectors and in particular to novel overload protector means.

Affording overload protection to electrical devices has, in general been accomplished by two types of protectors, those that must be manually reset, and those that cyclically reset themselves. The automatic feature of the cycling reset type protector is very desirable in many installations. However, in a number of installations where the automatic resetting feature is desirable, the nature of the installation may also be such that prolonged periods of cycled operation by the protector are undesirable, for one reason or another.

One reason for the undesirability of prolonged cycled resetting of the protector is that providing protectors with sufficient stamina to withstand prolonged cycling necessitates an expensive construction, particularly when high currents are to be carried by the protector. For example, difficulty from this quarter has been encountered in affording adequate overload protection to larger power single phase motors. Many single phase motors at present are furnished with protectors that protect the motor against not only total overload current flow to the motor, but also against overload current flow in the starting winding. This dual protection is necessary, because, under certain conditions, as when the starting winding is left in the circuit due to failure of the starting winding to be taken out of the circuit, the total current to the motor decreases while the current to the starting winding increases. Under these circumstances, protection based on total current flow to the motor is inadequate to prevent the starting winding from overheating. It is readily seen, however, that if the protector for affording protection to the starting winding is of the automatic reset type, it is possible, in the case of complete failure of the device that removes the starting winding, that the starting winding protector might cyclically function for long periods of time. Protectors with sufficient stamina and current capacity to afford protection to larger horsepower single phase motors under conditions of prolonged cycled operation are expensive to manufacture.

It is therefore an object of this invention to provide an inexpensive overload protector means for a single phase motor, capable of affording protection both to the starting winding alone, as well as the entire motor.

Another object is to provide a novel single phase motor having an overload protector that is adapted to afford overload protection both to the starting winding alone and to the entire motor, and which will stop the motor upon sustained overload in either winding.

A further object is to provide a novel single phase motor having an overload protector that is adapted to afford overload protection both to the starting winding alone and to the entire motor, and which will automatically reset itself a predetermined number of times during any one protracted period of overload.

Still another object is to provide a novel inexpensive, overload protector for an electric motor that will stop the motor after a predetermined period of cycled operation due to overload.

Other objects and advantages of the invention will become apparent from the subsequent description taken in conjunction with the accompanying drawing wherein:

The drawing is a schematic representation of one specific embodiment of the invention.

The objects of the invention are accomplished, in general, by providing a single phase electric motor with an inexpensive heat responsive overload protector means adapted to control current flow in the motor in response to overload, and having heater means in addition to that normally provided in such protectors. The additional heater means is located and arranged to progressively raise the temperature of the protector means, during a period of overload. More specifically, the protector means that is provided in a single phase motor, comprises a pair of inexpensive heat responsive, overload protectors connected in the motor circuit. One of the protectors is connected to be operable to open in response to current flow to the starting winding to stop current flow thereto during a period of sustained overload current flow to the starting winding, while the other protector is connected to be operable to open in response to the total current flow to the motor to stop current flow thereto during a period of sustained overload current flow to the motor. The additional heater means is arranged to become heated upon operation of either of the protectors so that at least the protector that is arranged to stop the current flow to the motor, will ultimately be held open.

Protectors of the cycling reset type are of particular utility when employed in this fashion. The rate at which the additional heater means raises the temperature of the protectors determines the length of the period of overload during which a protector will be permitted to cyclically reset itself. If the overload clears during that period, normal operation will resume, but if the overload persists beyond that period, motor operation will be terminated. Thus, by progressively raising the temperature of the protector means in this fashion, cycled resetting is limited to any desirable and tolerable amount.

Referring to the drawing, a specific embodiment of the invention is schematically shown in conjunction with a single phase electric motor 11. Motor 11 is shown as a capacitor start, induction motor, in this instance, having a running winding 12 and an axially displaced starting winding 13, each winding being connected at one end to one conductor 14 of a line. The other end of running winding 12 is connected through an overload protector means shown generally at 16, to another conductor 17 of the line. The other end of starting winding 13 is connected through a capacitor 18, a speed responsive switch 19 and protector means 16 to conductor 17.

As is well understood in the art, upon starting motor 11, switch 19 is initially closed, and current flow through the starting winding 13 is out of phase with the current flow through the running winding 12, by virtue of the effect of capacitor 18. The flux generated by the windings 12 and 13 creates the resultant rotating magnetic field essential to the starting of an induction motor. As the speed of the motor increases during starting, the total current to the motor declines, but the current to the starting winding 13 increases. Switch 19 is thus provided to open the starting winding circuit when the motor attains sufficient speed, in order to obtain optimum performance. Switch 19 is operable in response to the rotative speed of the motor and may be actuated by means such as a centrifugal device or a speed responsive relay. After switch 19 has opened, the current flow to the motor through running winding 12 normally continues to decline, until the motor has reached operating speed.

Overload protector means 16 is of the type that affords protection in response to sustained overload current flow. In this instance it is arranged to afford protection to both the starting winding alone and to the entire motor. It is shown as having, a first heat sensitive switch 21 with one contact connected to conductor 17 and its other contact connected to one end of a low resistance heater element 22. Heater element 22 is positioned to heat switch 21. The other end of heater element 22 is connected to running winding 12 and also to one contact of a second heat sensitive switch 23. The other contact of switch 23 is in turn connected to one end of another low resistance heater element 24. The other end of heater element 24 is connected through switch 19 and capacitor 18 to the starting winding 13, and heater element 24 is positioned to heat switch 23. It is thus seen from these connections that heater element 22, by virtue of its connections to both the starting and running windings, is energized by the total current flowing to the motor. It is also seen that heater element 24 is energized only by the current flowing to the starting winding. It should be understood, however, that the current flow energizing heaters 22 and 24 is insufficient to actuate switches 21 and 23, except during periods of overload current flow. The aforementioned elements comprising protector means 16 are normally obtainable as a pair of inexpensive heat responsive overload protectors, each having a heat responsive switch in series with a low resistance heater.

Protector 16 also comprises an additional heater means. In the instant embodiment it comprises a third heater element 26 arranged to function when either of the switches 21 and 23 is opened. Thus, element 26 has one end connected to the aforesaid one end of switch 21 and has its other end connected to the said other end of heater 24. Heater element 26 is a high resistance element and by virtue of its being connected in parallel with switches 21 and 23 and their respective heater elements 22 and 24, is adapted to become heated by approximately line voltage when either of the switches 21 and 23 are opened. Heater element 26 is located to raise the temperature of protector 16, and it is proportioned and positioned so as to raise that temperature at a predetermined rate.

Any number of variations of operation are possible by varying the proportioning and location of heater element 26. It can be located to heat only one of the heat responsive switches or to heat both simultaneously. It can be located to raise the protector temperature quickly or slowly. In the present instance, heater element 26 is located to heat both switches simultaneously and is proportioned to gradually raise the temperature of protector 16 sufficiently to hold the switches open. The functioning of protector 16 will be described for a number of different operating conditions.

Upon the occurrence of a fault during starting, as for example a locked rotor, high overload current flow is sustained through both the running winding and the starting winding. Thus, heater elements 22 and 24 become heated and the heat therefrom quickly opens switches 21 and 23 shutting off current flow through running winding 12 and substantially shutting off current flow through starting winding 13, together with heaters 22 and 24. Approximately line voltage is then impressed on heater element 26, the voltage drop across capacitor 18 and starting winding 13 being negligible, and heater element 26, will become heated and gradually raise the temperature of the protector. Although the protectors that comprise protector means 16 may be of the type requiring manual resetting, in the preferred embodiment they are of the cycling reset type in which switches 21 and 23 cool efficiently in the interim, to again close and reestablish current flow to the windings. If the locked rotor condition has cleared, the motor starts, upon closing of switches 21 and 23, current flow diminishes to a lower level through heater elements 22 and 24 and line voltage is no longer available to heater 26, so that it will no longer heat. In event the locked rotor condition has not cleared, upon closing of switches 21 and 23, heater elements 22 and 24 are again heated and again open switches 21 and 23, after which heater element 26 continues to raise the temperature of protector 16. The above cycled operation will continue a predetermined number of times to permit the fault to clear. Ultimately, however, if the fault has not cleared, the temperature of protector 16 will have raised sufficiently to hold open switches 21 and 23, and further cycling of the protector does not occur until the fault has been cleared and protector 26 allowed to cool.

Upon occurrence of an ordinary operational overload while the motor is running at operational speed with starting winding 13 out of the circuit, overload current through the running winding energizes heater element 22 to open switch 21 and deenergize the motor. Upon opening of switch 21, heater element 26 is energized by substantial line voltage and begins to heat protector 16. At the same time the motor stops. Thereafter, switch 21 cools sufficiently to reclose, and if the overload has cleared the motor again starts. If the overload has not cleared, cycled operation occurs as described in the preceding paragraph until the overload clears or until heater element 26 has raised the temperature of protector 16 sufficiently to hold open switch 21, whichever occurs first.

Should a fault occur in the starting winding circuit after starting of the motor has been accomplished, as when switch 19 fails to properly open and disconnect starting winding 13, a high current flow exists in the starting winding circuit, even though the total current flow to the motor through heater element 22 diminishes to a lower level. The high current flow through starting winding 13 sufficiently energizes heater element 24 to open switch 23. Upon opening of switch 23, heater element 26 is energized by substantially line voltage and begins to heat protector 26. Switch 23 thereafter cools sufficiently to reclose. If switch 19 in the interim has opened, operation becomes normal and heater element 26 is deenergized. If, however, switch 19 has not opened, cycled operation of switch 23 proceeds until either switch 19 opens or until heater element 26 raises the temperature of protector 16 sufficiently to open and hold open switch 21, and thus stop the motor. By modifying the proportioning and location of heater element 26 so that it will more quickly raise the temperature of the protector, the above described functioning will be modified to further limit or eliminate the period of cycled functioning of the protector.

A fault of the character described in the above paragraph has been of particular concern because with the automatic reset protection heretofore provided, it was possible for the protector to cyclically function for long periods of time, as previously mentioned, and even until it ultimately failed. It is seen however, that a circuit embodying this invention affords automatic reset protection to a motor while at the same time it limits the period of protector cycling to any specific desired amount. By limiting the period of cycling, the number of cycles that the protector must endure is also limited and, thus, the invention permits inexpensive construction of protectors even for large horsepower motors.

Although the invention has been described with reference to a certain specific structural embodiment, it is to be understood that various modifications and alternative structure may be resorted to without departing from the scope of the invention as defined in the appended claims.

I claim:

1. In combination, a single phase electric motor having a running winding and a starting winding, a first heat responsive overload protector connected in series with said windings and operable by sustained overload current flow to said windings to open the connection thereto, a second overload protector connected in series with said starting winding and operable by sustained overload current to said starting winding to open the connection thereto, and heater means located to heat said first overload protector and operable in response to operation of said protector whereby said first protector is opened and held open.

2. In combination, a single phase electric motor having a running winding and a starting winding, a first heat responsive overload protector connected in series with said windings and operable by sustained overload current flow to said windings to open the connection thereto, a second overload protector connected in series with said starting winding and operable by sustained overload current to said starting winding to open the connections thereto, and heater means located to heat said first protector and operable in response to operation of either of said protectors, whereby said first protector is opened and held open.

3. In combination, a single phase electric motor having a running winding and a starting winding, a first heat responsive overload protector connected in series with said windings and operable by sustained overload current to said windings to open the connections thereto, a second heat responsive overload protector connected in series with said starting winding and operable by sustained overload current to said starting winding to open the connection thereto, and heater means located to heat both of said protectors and operable in response to operation of either of said protectors, whereby the protector which has operated is held open and the other protector is opened and held open.

4. In combination, a single phase electric motor having a running winding and a starting winding, a first heat responsive protector of the cycling reset type connected in series with said windings and operable by sustained overload current flow to said windings to open the connection thereto, a second heat responsive protector of the cycling reset type connected in series with said starting winding and operable by sustained overload current flow to said starting winding to open the connection thereto, and heater means located to heat both of said protectors and operable in response to operation of either of said protectors, whereby the protector which has operated is permitted to cycle a predetermined number of times and then is held open and the other protector is opened and held open.

5. In combination, a single phase electric motor having a running winding and a starting winding, a first heat responsive overload protector having a first heater element in series with and located adjacent a first heat actuated switch, said first protector being connected in series with said windings and operable by sustained overload current flow through said first heater element to said windings to open the connection thereto, a second overload protector having a second heater element in series with and located adjacent a second heat actuated switch, said second protector being connected in series with said starting winding and operable by sustained overload current flow through said second heater element to said starting winding to open the connection thereto, and a third heater element located to heat said first overload protector and operable in response to operation of said second protector, whereby said first protector is opened and held open.

6. In combination, a single phase electric motor having a running winding and a starting winding, heat responsive overload protector means of the cycling reset type operable by sustained overload current flow to said windings and adapted to cyclically open and close connections to said windings during a period of overload current flow thereto, and heater means located to heat said protector means and operable in response to operation of said protector means, said heater means being so proportioned and so positioned relative to said protector means that said protector means operates a predetermined number of times and then is held open by heat from said heater means.

7. In combination, a single phase electric motor having a running winding and a starting winding, a first heat responsive overload protector in series with said windings and adapted to stop said motor during a period of overload current flow thereto, a second heat responsive overload protector of the cycling reset type in series with said starting winding and operable by sustained overload current flow to said starting winding to cyclically open and close the connection thereto, and heater means located to heat said first protector and operable in response to operation of said second protector, said heater means being so proportioned and so positioned relative to said first protector that, upon opening and closing of said second protector a predetermined number of times, said first protector is opened and held open by heat from said heater means.

8. In combination, a single phase electric motor having a running winding and a starting winding, a first heat responsive overload protector of the cycling reset type in series with said windings and operable by sustained overload current flow to said windings to cyclically open and close the connection to said motor during a period of overload current flow thereto, a second heat responsive overload protector of the cycling reset type in series with said starting winding and operable by sustained overload current flow to said starting winding to cyclically open and close the connection thereto, and heater means located to heat said protectors and operable in response to operation of either of said protectors, said heater means being so proportioned and so positioned relative to said protectors that upon one of said protectors operating a predetermined number of times said one protector is held open and the other protector is opened and held open by heat from said heater means.

9. In combination, a single phase electric motor having a running winding and a starting winding each having one end connected to a common terminal adapted to be connected to one conductor of a line, a first heat responsive overload protector adapted to be connected to the other conductor of the line and having a first heat responsive switch in series with a first low resistance heater element located to heat said first switch, a second heat responsive overload protector having a second heat responsive switch in series with a second low resistance heater element located to heated said second switch, said second protector interconnecting said first protector and said starting winding and being responsive to current flow to said starting winding and operable by sustained overload current flow to said starting winding to cyclically open and close the connections thereto, said first protector also being connected to said running winding to be responsive to the total current flow to both of said windings and operable by sustained overload current flow to said windings to cyclically open and close the connection thereto, and a third high resistance heater element connected across both of said protectors to be operable upon opening of either of said protectors and being located to heat both of said protectors, said third heater element being so proportioned and so positioned relative to said protectors that upon either of said protectors operating a predetermined number of times it is opened and held open and the other protector is opened and held open by heat from said third heater element.

10. Heat responsive overload protector means of the cycling reset type for protecting the windings of a motor or the like, comprising a heater element, a heat responsive switch in series with said heater element and adapted to open and close in response to heating and cooling of said heater element, and heater means intermittently energized in response to opening of said switch and located adjacent said switch, said heater means being so proportioned and so positioned relative to said switch that said switch is adapted to open and close a predetermined number of times and then be held open by heat from said heater means.

11. Heat responsive overload protector means of the cycling reset type for protecting the windings of a motor or the like, comprising a low resistance heater element, a heat responsive switch in series with said heater element and adapted to open and close in response to heating and cooling of said heater element, and a high resistance heater located adjacent said switch and connected in parallel with said switch and said low resistance heater element to be energized during the periods said switch is open, said high resistance heater being so proportioned and so positioned relative to said switch that said switch is adapted to open and closes predetermined number of times and then be held open by heat from said heater means.

12. Heat responsive overload protector means comprising a pair of heat responsive overload protectors connected in series, and a heater located to heat both of said protectors, said protector means being adapted to be connected in a circuit in a fashion such that one of said protectors is responsive to current flow in one portion of the circuit and operable by sustained overload current therein to open the connection thereto, and such that the other of said protectors is responsive to current flow in another portion of the circuit and operable by sustained overload current therein to open the connection thereto, said heater means being operable in response to operation of either of said protectors to heat both of said protectors and thereby ultimately to hold open the protector which has operated and to open and hold open the other protector.

No references cited.